(12) United States Patent
Gomony et al.

(10) Patent No.: US 10,872,045 B1
(45) Date of Patent: Dec. 22, 2020

(54) METHOD AND APPARATUS FOR SYMBOL DETECTION

(71) Applicant: Nokia Technologies Oy, Espoo (FI)

(72) Inventors: Manil Dev Gomony, Antwerp (BE); Mamoun Guenach, Vilvoorde (BE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/915,645

(22) Filed: Jun. 29, 2020

(30) Foreign Application Priority Data

Jul. 11, 2019 (FI) .................................. 20195630

(51) Int. Cl.
*G06F 13/16* (2006.01)
*H04B 7/08* (2006.01)
*H04B 7/0413* (2017.01)
*G06F 7/57* (2006.01)

(52) U.S. Cl.
CPC ............ *G06F 13/1678* (2013.01); *G06F 7/57* (2013.01); *H04B 7/0413* (2013.01); *H04B 7/08* (2013.01)

(58) Field of Classification Search
CPC ..... G06F 13/1678; G06F 7/57; H04B 7/0413; H04B 7/08
See application file for complete search history.

(56) References Cited

U.S. PATENT DOCUMENTS 7,443,928 B2   10/2008  Nefedov et al.
10,615,899 B1 *  4/2020  Bultan ..................... H04J 11/00

2006/0274836 A1  12/2006  Sampath et al.
2007/0136648 A1   6/2007  Kwon et al.
2014/0161210 A1   6/2014  Chen et al.
2015/0222457 A1   8/2015  Kaplan et al.

FOREIGN PATENT DOCUMENTS

EP         1011205 A2    6/2000

OTHER PUBLICATIONS

Notice of Allowance received for corresponding Finnish Patent Application No. 20195630, dated Jul. 3, 2020, 5 pages.
Liu et al., "Hardware Design of Sphere Decoding for MIMO Systems", Proceedings 2005 IEEE International SOC Conference, Sep. 25-28, 2005, pp. 287-290.

(Continued)

*Primary Examiner* — Kabir A Timory
(74) *Attorney, Agent, or Firm* — Nokia Technologies Oy

(57) ABSTRACT

Apparatus and method for symbol detection are disclosed. The solution comprises obtaining (400) multiple-input-multiple-output symbols received over a transmission channel, the symbols comprising a plurality of layers, each layer comprising a constellation point of multiple candidate constellation points, selecting (402) for each layer a precision, each layer having a precision smaller or equal than the precision of a previous layer and searching (404) for each layer, utilising the selected precision, the constellation point among the candidate constellation points by minimising a given cost function, utilising a plurality of Arithmetic and Logic Units, ALUs, comprising at least one real and imaginary part, the ALUs of the apparatus comprising real and imaginary part having different precisions by having different number of bits, the data memory and the plurality of ALUs being connected with each other by a data bus of a given width.

18 Claims, 5 Drawing Sheets

(56) References Cited

OTHER PUBLICATIONS

Huang et al., "System Architecture and Implementation of MIMO Sphere Decoders on FPGA", IEEE Transactions on Very Large Scale Integration (VLSI) Systems, vol. 16, No. 2, Feb. 2008, pp. 188-197.
Burg et al., "VLSI implementation of the sphere decoding algorithm", Proceedings of the 30th European Solid-State Circuits Conference, Sep. 23, 2004, pp. 303-306.
Rahman et al., "Hardware Architecture of Complex K-best MIMO Decoder", International Journal of Computer Science and Security (IJCSS), vol. 10, No. 1, 2016, pp. 1-13.
Judd et al., "Reduced-Precision Strategies for Bounded Memory in Deep Neural Nets", arXiv, Jan. 8, 2016, pp. 1-12.
Zimmermann et al., "On the Complexity of Sphere Decoding", Proc. International Symp. on Wireless Pers. Multimedia Commun, 2004, 5 pages.
Georgis et al., "Geosphere: An Exact Depth-first Sphere Decoder Architecture Scalable to Very Dense Constellations", IEEE Access, vol. 5, Mar. 20, 2017, pp. 4233-4249.
Office action received for corresponding Finnish Patent Application No. 20195630, dated Feb. 10, 2020, 8 pages.
Burg et al., "VLSI Implementation of MIMO Detection Using the Sphere Decoding Algorithm", IEEE Journal of Solid-State Circuits, vol. 40, No. 7, Jul. 2005, pp. 1566-1577.

\* cited by examiner

METHOD AND APPARATUS FOR SYMBOL DETECTION

TECHNICAL FIELD

The exemplary and non-limiting embodiments of the invention relate generally to communications.

BACKGROUND

Wireless telecommunication systems are under constant development. There is a constant need for higher data rates and high quality of service. Partly for these reasons the modern telecommunication systems, such as fifth generation, 5G, networks are moving towards millimeter-wave, mmW, frequencies to seek for wide spectrum access, which eventually enables extremely high data rates.

To achieve high capacity and data rate Multiple-Input Multiple-Output, or MIMO, transmission has been studied. MIMO is a term that is used for a method of transmitting and receiving of more than one data signal simultaneously over the same radio channel. A base station or access point of a communication system may transmit using many antenna beams pointed in different directions instead of an omnidirectional transmission. Respectively a user terminal may utilize more than one antenna in reception and transmission of signals.

In MIMO transmission more than one symbol is transmitted at a same time. In the receiver, the task is to decode the received symbols. Various detectors have been proposed for decoding a MIMO signal. A Minimum mean square error, MMSE and Zero Forcing, ZF, MIMO detectors are relatively simple to realize but the performance is far from the optimal. On the other hand, maximum likelihood detection has a good performance but has a very high complexity. Sphere detection algorithm is a tree search based approach that can achieve the maximum likelihood solution, and is widely considered to be the most promising approach for MIMO detection. In sphere detection, the purpose is to find the closest lattice point to the received symbol and limit the search space within those lattice points that fall within a sphere that is centered at the received symbol. However, sphere detection suffers from very high computational complexity that leads to high latency.

BRIEF DESCRIPTION

According to an aspect of the present invention, there is provided an apparatus of claim 1.

According to an aspect of the present invention, there is provided a method of claim 13.

According to an aspect of the present invention, there is provided a computer program of claim 15.

The scope of protection sought for various embodiments of the invention is set out by the independent claims.

The embodiments and or examples and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

In the following, different exemplifying embodiments will be described using, as an example an access architecture to which the embodiments may be applied, a radio access architecture based on long term evolution advanced (LTE Advanced, LTE-A), enhanced LTE (eLTE), or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), or any combination thereof.

Figure 1:
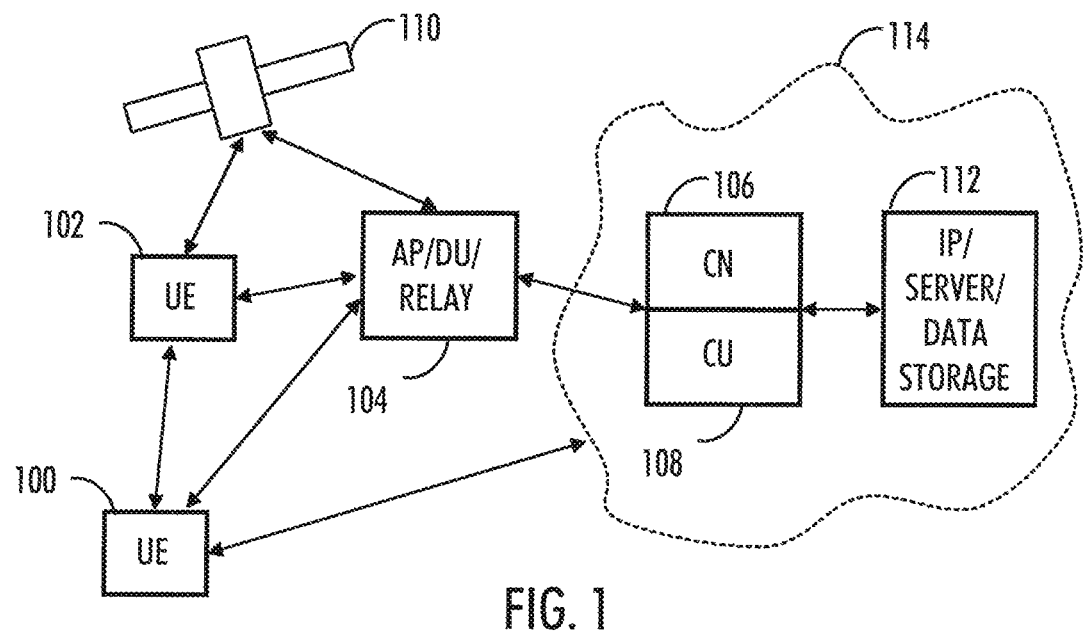
FIG. 1 illustrates an example of a communication environment where some embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), User Plane Function (UPF), etc.

The user device, or end-user handheld device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user device may also be a device having capability to operate utilizing enhanced machine-type communication (eMTC). The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, perhaps more base stations or nodes than the LTE (a so-called small cell concept), including macro sites operating in co-operation with smaller stations and employing a variety of radio technologies depending on service needs, use cases and/or spectrum available. 5G mobile communications support a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-mmWave). As mentioned, one of the concepts considered to be used in 5G networks is network slicing in which multiple independent and dedicated virtual sub-networks (network instances) may be created within the same infrastructure.

The current architecture in LTE networks is fully distributed in the radio and fully centralized in the core network. The low latency applications and services in 5G require to bring the content close to the radio which leads to local break out and mobile edge computing, (MEC). 5G enables analytics and knowledge generation to occur at the source of the data. This approach requires leveraging resources that may not be continuously connected to a network such as laptops, smartphones, tablets and sensors. Mobile edge computing provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus, they are designed together and interworking between the units is easy. The interface between CU and DU is currently being standardized by 3GPP and it is denoted F1 interface. Therefore, in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

The present solution relates to processing a signal received by a receiver or transceiver in a base station or a user terminal. The task of the receiver or transceiver is to decode the symbols the received signal comprises. The proposed solution relates especially to MIMO detection. Thus the signal has been transmitted utilizing more than one antenna or antenna element and also received likewise, utilizing more than one antenna or antenna element.

In general, the received signal may be expressed in form $$y = Hx + z,$$

where $H \in \mathbb{C}^{N_t \times N_r}$ is the effective channel matrix, $N_t$ and $N_r$ are the number of transmitter, Tx, and receiver, Rx, antennas, $x \in \mathbb{C}^{N_t}$ is the transmitted signal comprising symbols to be decoded, and z is thermal noise. In an embodiment, elements in vector x may be modulated Quadrature Amplitude Modulation, QAM, symbols, for example. Also other modulation methods may as well be used. The above model is valid also when precoding is used in transmission. In such a case, H=GW in this case, where G is the "full" channel matrix, and W is the precoder. Therefore, $N_t$ can be understood as the number of spatial layers. As demodulation reference signal DMRS is precoded, the receiver estimates only H.

In digital modulation methods, a constellation may be used to illustrate possible symbols to be transmitted. The purpose of decoding is to find the node in the constellation that most likely corresponds to the received symbol.

Sphere detection algorithm is one proposed solution for decoding MIMO signals. It has been proposed as a key to improve symbol detection performance in 5G receivers in the presence of interference and fading. In some cases it has been referred as sphere decoding in uplink direction and as sphere encoding in downlink direction. It may be noted that sphere detection can be combined with lattice reduction algorithm, which can further reduce the search space of sphere detection.

Figure 2:
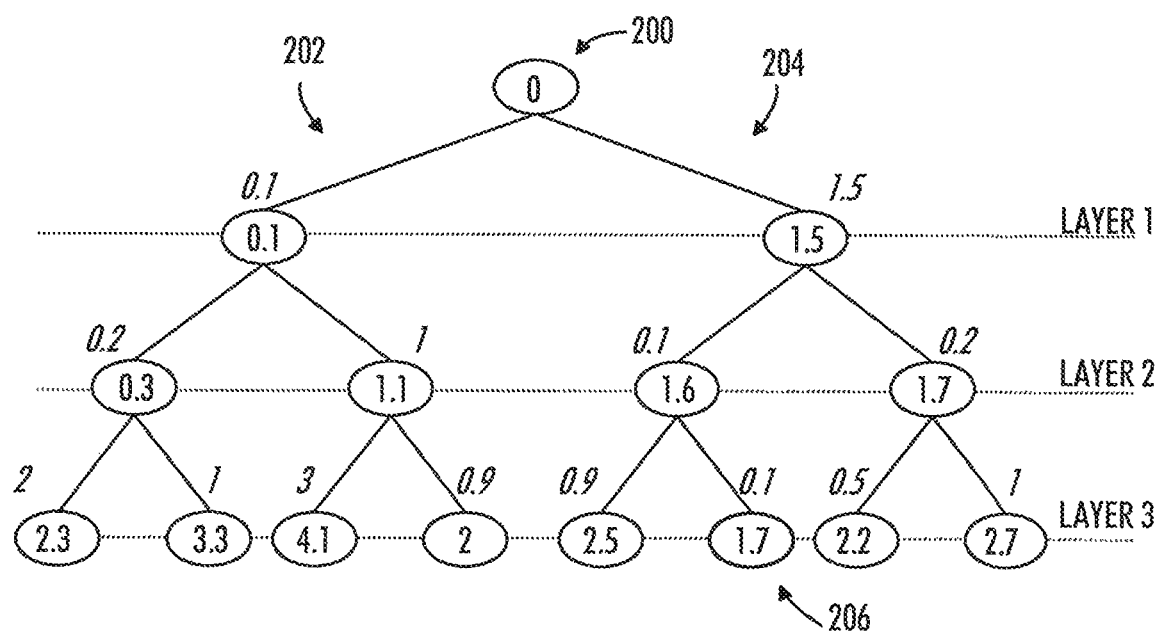
FIG. 2 illustrates an example of sphere decoding.

FIG. 2 illustrates an example of sphere decoding. Assuming a constellation size of M and a MIMO system of size N×N (for simplicity), sphere detection requires an initial "sphere radius" such that the search space is limited to the solution points "inside a sphere" instead of the entire set of $2^l$ possible values. Inside the sphere radius, a cost function is minimised and the point corresponding to the smallest distance is chosen as the solution, by searching the search space using a tree structure as shown in the example of FIG. 2. The search in the tree relies on the QR decomposition of the channel (where channel matrix H is decomposed as an orthogonal matrix Q and an upper triangular matrix R), thus allowing an iterative search in the tree until a point is found inside the sphere. Then, the new search is performed based on the new radius. The search in the tree involves N levels and the value of N can vary depending on the number of antennas. From each node in the tree, there can be M possible child nodes.

In the example of FIG. 2, there is root node 200. Two branches 202, 204 exist. This simplified example comprises three layers. All the paths need to be taken into account. i.e. all branch distance metric need to be computed in order to find the optimal ML solution. As the outcome the maximum likelihood solution is obtained at 206.

As FIG. 2 illustrates, one problem related to the sphere decoding is that the complexity of solution increases with number of antennas and constellation size. Thus, computational requirements grow exponentially with increasing number of layers. Because of this increasing complexity, practical hardware implementations are not feasible. The problem has been tried to solve by relying on improving hardware performance by pipelined hardware implementation and efficient memory system management. However, a satisfying solution has not been found due to the increasing complexity of the algorithm especially, for large scale MIMO and large constellation sizes in use in 5G systems.

Figure 3:
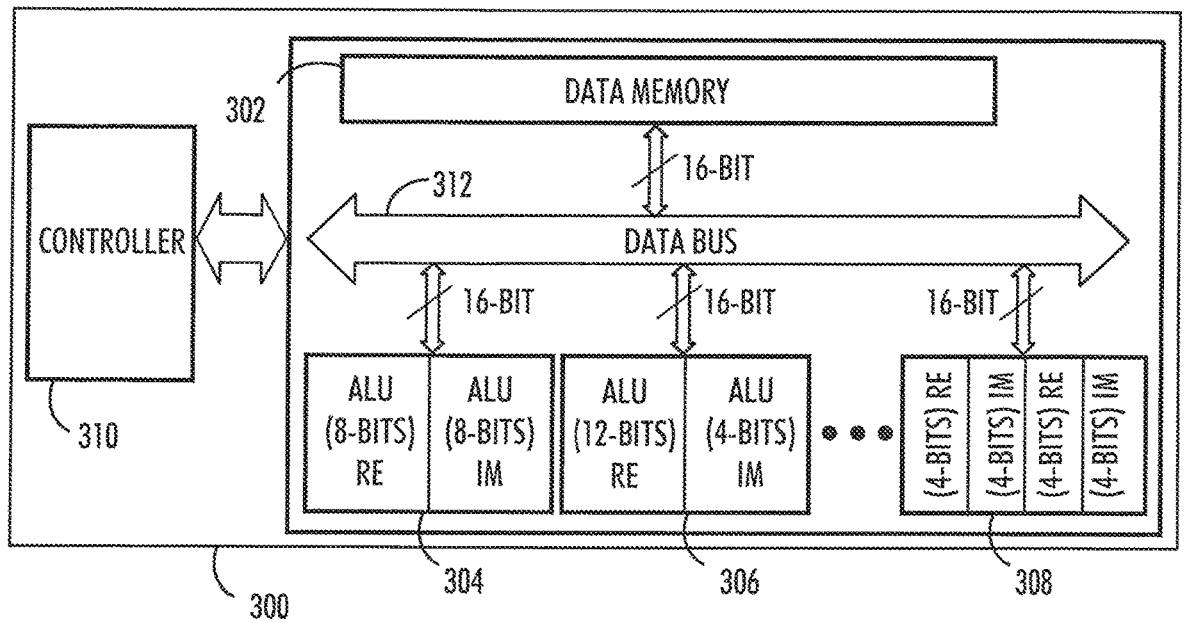
FIG. 3 illustrates an example of an apparatus employing some embodiments of the invention.

FIG. 3 illustrates an embodiment. The figure illustrates a simplified example of an apparatus applying embodiments of the invention. In some embodiments, the apparatus may be a part of a gNB, a part of a user terminal, or a or any other entity or network element of the communication system provided that the necessary inputs are available and required interfaces exists to transmit and receive required information.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 300 comprises a data memory 302. The data memory is configured to store the input and output variables. The data memory may be configured to obtain multiple-input-multiple-output transmission symbols received over a transmission channel. The symbols comprise a plurality of layers, each layer comprising a constellation point of multiple candidate constellation points.

The apparatus 300 further comprises a plurality of Arithmetic and Logic Units (ALUs), 304, 306, 308.

The apparatus 300 further comprises a controller 310 configured to control the data memory and the plurality of ALUs.

The apparatus 300 further comprises a data bus 312 of a given width connecting the controller, the data memory, and the plurality of ALUs with each other.

Each ALU 304, 306, 308 consists of basic arithmetic hardware units, such as multipliers, dividers, adders, and shifters, for example, to perform computation of the arithmetic operations involved in every layer of sphere detection algorithm. Each ALU performs an arithmetic operation on a complex number, and hence each ALU comprises hardware units for at least one real, RE, and imaginary, IM, part. There may be one or more ALUs with different computational precision. Thus, the basic arithmetic units may be optimized for computation with a specific precision.

At least for some ALUs, the number of the bits of the at least one real part and at least one imaginary part of an ALU may be unequal. Thus, The computational precision for the real and imaginary parts can be different, the sum being equal to the given width of the data bus 312. In addition, an ALU can also perform more than one lower precision complex number computation simultaneously. However, the sum of the bits of all the real and imaginary parts of an ALU is the same as the data memory bus width which width also corresponds to the width of the data bus to the memory. This is to make sure that all memory read operations from different ALUs are efficient.

For example, as illustrated in the example of FIG. 3, if the data bus width is 16-bits, the ALU can be of 8-bits each for the real, RE, and imaginary, IM, as in ALU 304, 12-bit for the real and 4-bit for imaginary as in ALU 306, 4-bit each for real and imaginary for two complex number operations as in ALU 308, etc.

In addition to the arithmetic units, the ALUs may also perform a precision conversion operation for example by simply discarding certain number of bits after computation of the real and imaginary parts. The controller may then be configured to combine two such converted outputs into a data word and write the word to the data memory.

In an embodiment, the controller is configured to search utilising ALUs for each layer the constellation point among the candidate constellation points by minimising a given cost function, wherein the search on each layer is performed utilising a given precision, each layer having a precision smaller or equal than the precision of a previous layer, the search starting from the root node of the tree to the child nodes.

Thus in an embodiment, the computation of the cost function (Euclidean distance) between the received sample and a set of possible constellation points is performed with different precision settings for the different layers.

In an embodiment, the search space is limited by assigning higher precision to top layers and lower precision to bottom layers. For instance, if there are N layers, it is possible to have maximally N different precisions. For instance, higher precision can be assigned to the top layers in the tree and gradually decrease the precision as calculation moves to the bottom layers, because the early decisions in the top layers should be of higher accuracy, otherwise the wrong path in the tree might be selected due to the higher quantization noise introduced by lower precision computation.

In an embodiment, layers are divided in groups, each group comprising a number of successive layers. The same given precision may be applied in the layers belonging to the same group. The groups comprising top layers may utilise higher precision while the groups comprising lower layers may utilise decreased precision.

For example, if there are 16 layers, there may not be ALUs of 16 different precision in the hardware but only few. In that case, the layers can be split into groups with each group assigned with a precision setting. For example, the top 6 layers may be assigned with a single precision, the next 4 with another and so on.

In an embodiment, the apparatus 300 may be configured to receive parameters of the transmission channel and select the precision on each layer or group based on the determined parameters of the transmission channel.

Thus, optimal setting for layers may be determined by characterization of a system model consisting of a given channel, signal to noise ratio (SNR), and target error probability, for example.

Figure 4:
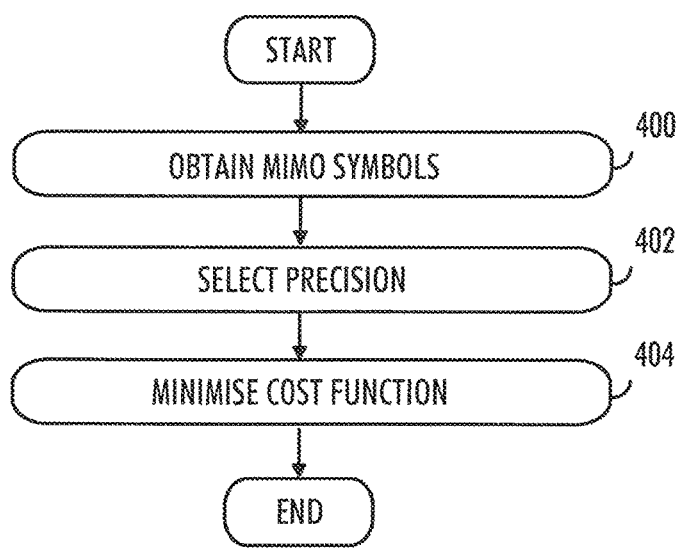
FIGS. 4, 5, 6, 7 and 8 are flowcharts illustrating some embodiments.

FIG. 4 is a flow chart illustrating an example embodiment of the operation of the apparatus of FIG. 3.

In step 400 of FIG. 4, the apparatus is configured to obtain multiple-input-multiple-output symbols received over a transmission channel, the symbols comprising a plurality of layers, each layer comprising a constellation point of multiple candidate constellation points.

In step 402 of FIG. 4, the apparatus is configured to select for each layer a precision, each layer having a precision smaller or equal than the precision of a previous layer.

In step 404 of FIG. 4, the apparatus is configured to search for each layer, utilising the selected precision, the constellation point among the candidate constellation points by minimising a given cost function, utilising a plurality of Arithmetic and Logic Units, ALUs, comprising at least one real and imaginary part, the ALUs of the apparatus comprising real and imaginary part having different precisions by having different number of bits, the data memory and the plurality of ALUs being connected with each other by a data bus of a given width.

Figure 5:
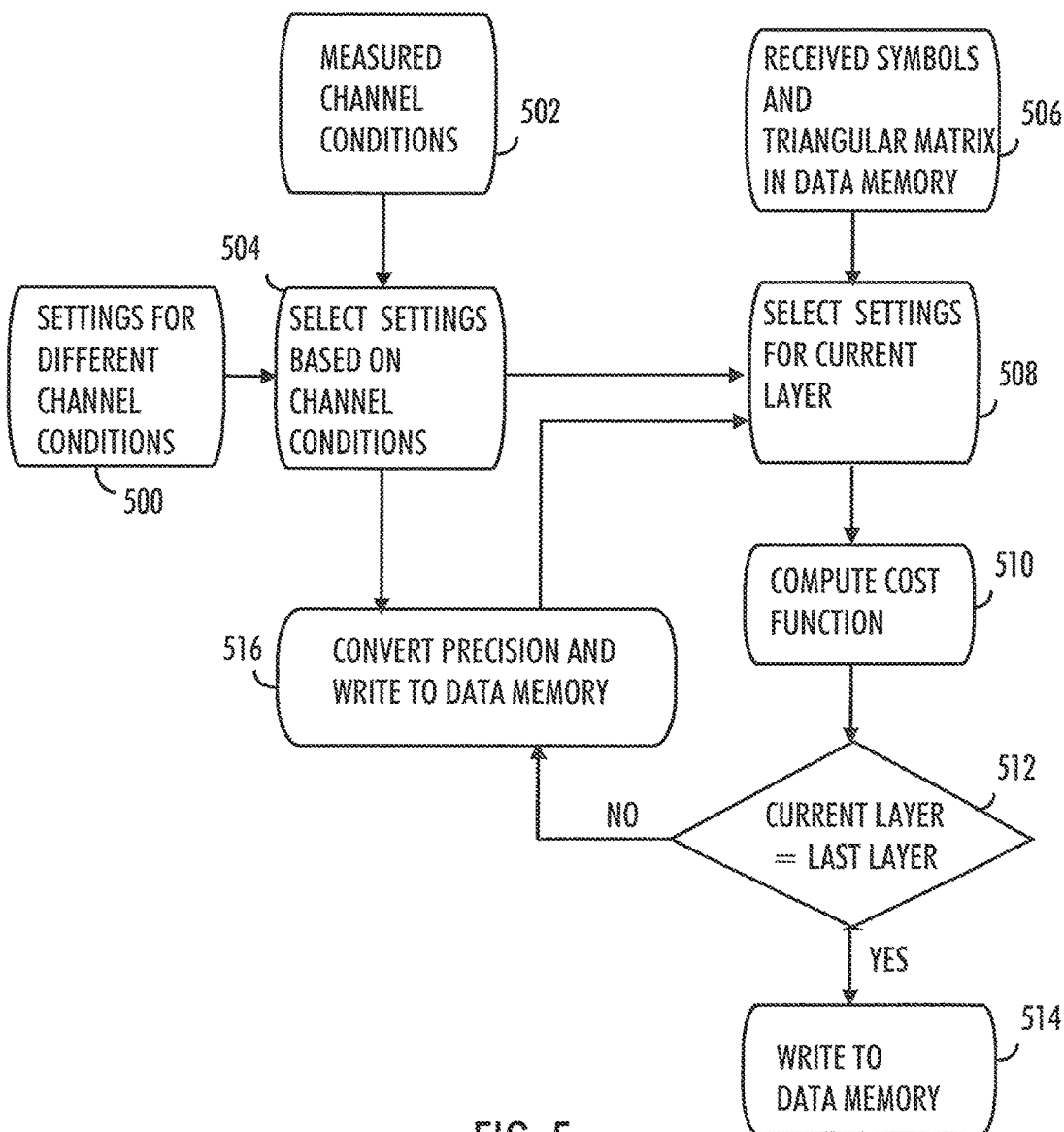

FIG. 5 is another flow chart illustrating an example embodiment of the operation of the apparatus of FIG. 3.

In step 500 of FIG. 5, the apparatus is configured to obtain information on required precision for the different layers under different parameters of the transmission channel. The information may be obtained from a database, for example. In an embodiment, the database, i.e. the precision profile, is built offline by running extensive simulations under different channel conditions.

In step 502 of FIG. 5, the apparatus is configured to obtain measured parameters of the transmission channel. The channel conditions may comprise signal to noise ratio, SNR, and target error probability, for example.

In step 504 of FIG. 5, the apparatus is configured to select the precision settings for different layers based on determined parameters.

In step 506 of FIG. 5, the apparatus is configured to store received symbols and calculated triangular matrix of QR method in data memory.

In step 508 of FIG. 5, the apparatus is configured to select the precision for current layer from the settings selected in step 504. The ALUs of the required precision for calculation of real and imaginary parts of the current layer are selected for use.

In step 510 of FIG. 5, the apparatus is configured to obtain output value by computing cost functions in real and imaginary parts of the selected ALUs.

In step 512 of FIG. 5, the apparatus is configured to determine if the current layer is the last layer. If so, the apparatus writes in step 514 the output value to data memory.

Otherwise, in step 516, the apparatus is configured to convert precision of the output value for next layer, write the output value to data memory and start to calculating next layer in step 508.

Thus, at start, the received symbols and the precomputed upper triangular matrix are stored in the data memory. The controller 310 is configured to execute the sphere detection algorithm and iterate through the different layers starting from the root until the bottom of the tree is reached. The precision settings for the real and imaginary parts for the different layers and under different channel conditions may be stored locally in the controller 210 or in an external database. When the decoding is performed, the controller 310 may first select the right precision profile (precision settings for all the layers) based on the channel conditions. The controller is the configured to select the precision setting for the current layer and schedule the data to the corresponding ALU of the selected precision for the real and imaginary part. The ALU performs the computation of real and imaginary parts and writes the result back to the data memory. The controller determines whether the output of an ALU is used to compute a next layer and instructs the ALU to perform a precision conversion operation for the next layer before writing back to the data memory. In an embodiment, the controller may turn off the unused ALUs to save power.

Figure 6:
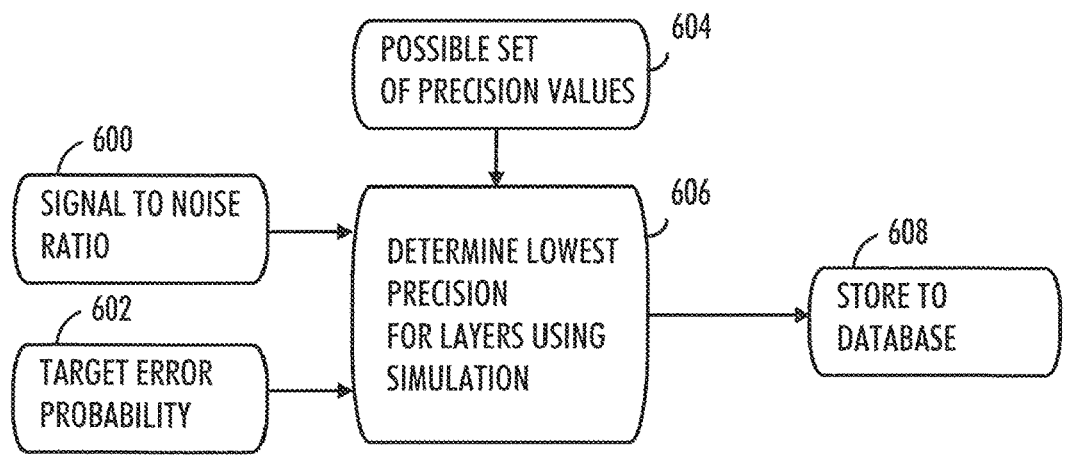

FIG. 6 illustrates an example for determining the optimal precision settings for the different layers. The example scheme comprises of characterization of a system model consisting of a given channel, given SNR 600, and target error probability 602. Possible set of precision values 604 may be fed to a suitable simulation tool and simulation 606 may be performed with different precision settings for the different layers and under different channel conditions. As an outcome, the optimal precision settings for the different layers 608 may be stored in the controller or a database.

It may be noted, that instead of storing the precision profile for all the channel conditions, the precision profile can be determined at run-time by learning the channel conditions and the system performance using machine learning techniques.

Figure 7:
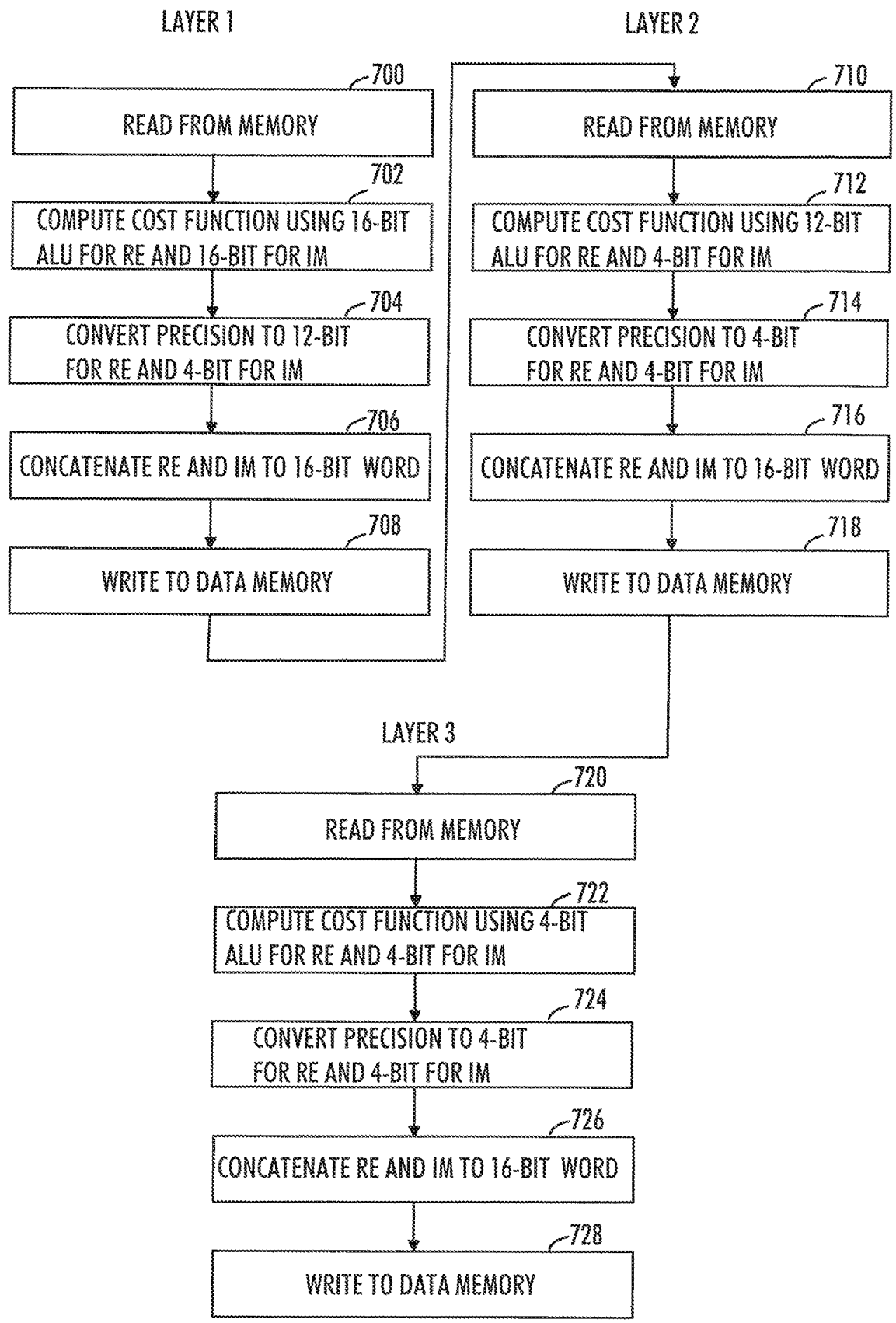

FIG. 7 is a further example illustrating sphere decoder hardware execution with a fixed precision allocation, i.e. when the optimal precision settings for the different layers are calculated beforehand.

The flowchart of FIG. 7 illustrates how the sphere decoding algorithm may be scheduled and executed in the hardware for an example scenario graph consisting of three layers: first layer consisting of one node, second layer two nodes and the third four nodes.

The cost function for the first layer is computed in steps 700 to 708. The cost function for the first layer is computed in 16-bit precision for both real and imaginary parts.

In step 700, input is read from 16-bit data memory.

In step 702, the cost function for first layer is calculated using 16-bit ALU for real part and 16-bit ALU for imaginary part.

In step 704, the output of real part is converted to 12-bit and imaginary part to 4-bit (for example by dropping off least significant bits).

In step 706, the real and imaginary parts are concatenated to a 16-bit word to obtain output for first layer.

In step 708, the output is written into the data memory as a 16-bit word.

The cost function for the second layer is computed in steps 710 to 718.

In step 710, input is read from 16-bit data memory.

In step 712, the cost function for second layer is calculated using 12-bit ALU for real part and 4-bit ALU for imaginary part.

In step 714, the output of real part is converted to 4-bit and imaginary part to 4-bit.

In step 716, 4-bit real and imaginary parts are concatenated to a 16-bit word to obtain output for second layer.

In step 718, the output is written into the data memory as a 16-bit word.

The cost function for the third layer is computed in steps 720 to 718.

In step 720, input is read from 16-bit data memory.

In step 722, the cost function for third layer is calculated using 4-bit ALU for real part and 4-bit ALU for imaginary part.

In step 724, the output of real part is converted to 4-bit and imaginary part to 4-bit.

In step 726, 4-bit real and imaginary parts are concatenated to a 16-bit word to obtain output for second layer.

In step 728, the output is written into the data memory as a 16-bit word.

Figure 8:
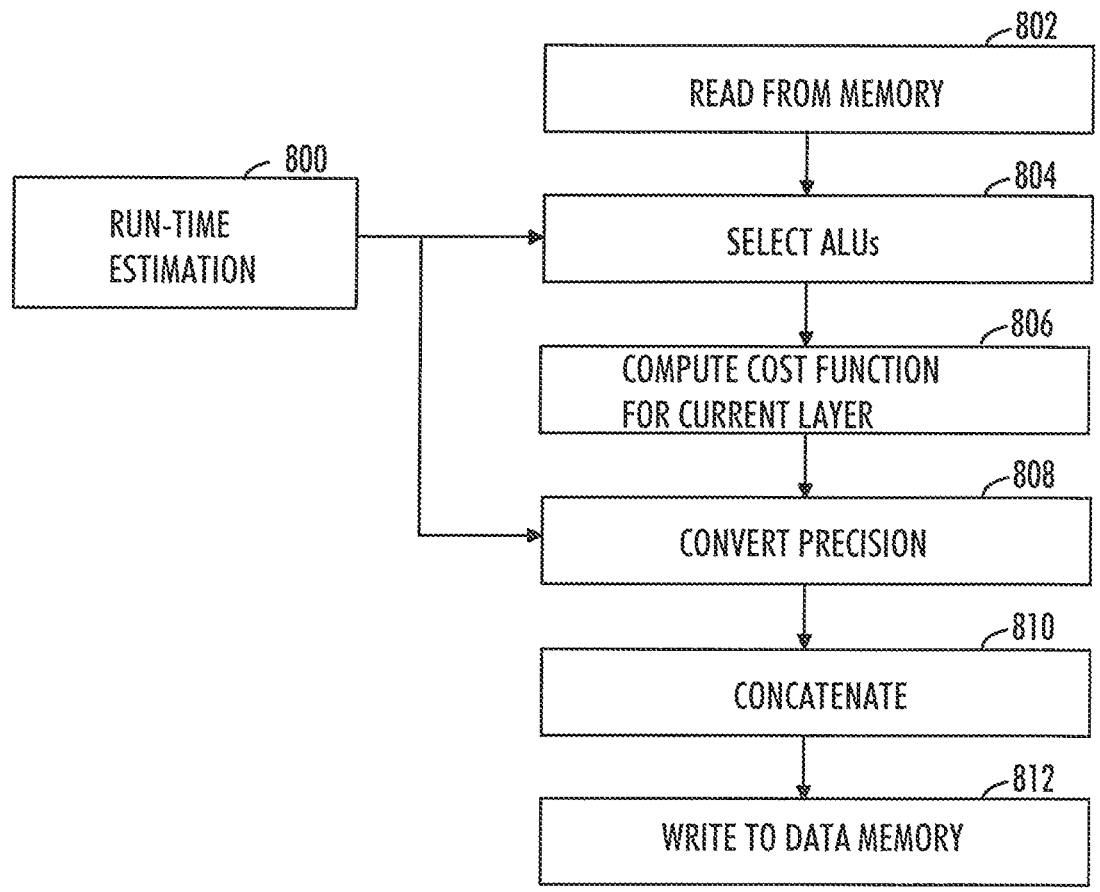

FIG. 8 is an example illustrating sphere decoder hardware execution with a dynamic precision allocation i.e. when the optimal precision settings for the different layers are estimated at run time.

The flowchart of FIG. 8 illustrates how the sphere decoding algorithm is scheduled and executed in the hardware when the precision settings are estimated dynamically, for instance using Machine learning (ML) techniques with inputs as the signal to nose ratio of the channel and the achieved performance (such as bit error rate). Computation of cost function may be performed by ALUs of different precision in different layers. The ALU precision for each layer is selected based on the estimated precision settings.

In step 800, layer precision settings are estimated at run-time based on channel parameters and achieved performance.

In step 802, input is read from a 16-bit data memory.

In step 804, after input from block 800, ALUs of required precision for real and imaginary part calculations are selected for the current layer.

In step 806, the cost function for real and imaginary part for current layer is calculated using the selected ALUs.

In step 808, the calculation output is converted to required precision setting for next layer based on input from phase 800 (for example by dropping off least significant bits).

In step 810, the real and imaginary parts are concatenated to a 16-bit word.

In step 812, concatenated data written into the data memory as a 16-bit word.

If the current layer is not the last layer, the computation moves to calculating next layer from step 802.

In the examples of FIGS. 7 and 8 it is also possible to divide layers in groups, each group comprising a number of successive layers and apply the same given precision to layers belonging to the same group.

Figure 9:
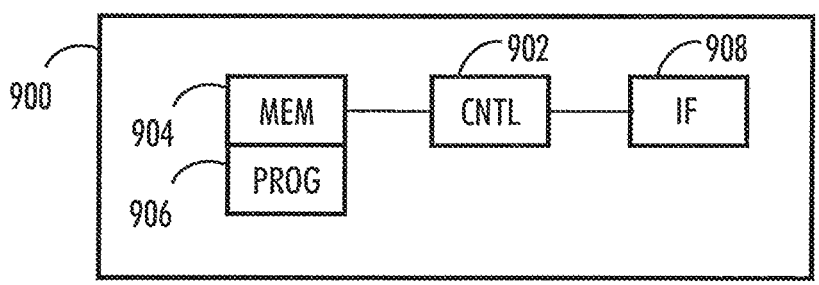
FIG. 9 illustrates an example of an apparatus employing some embodiments of the invention.

FIG. 9 illustrates an embodiment. The figure illustrates a simplified example of an apparatus applying embodiments of the invention. In some embodiments, the apparatus may be a gNB, or a part of a gNB, user terminal or a part of a user terminal or any other entity or network element of the communication system provided that the necessary inputs are available and required interfaces exists to transmit and receive required information.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 900 of the example includes a control circuitry 902 configured to control at least part of the operation of the apparatus. The control circuitry may be realized as a processor or more than one processors, for example.

The apparatus may comprise a memory 904 for storing data. Furthermore the memory may store software 906 executable by the control circuitry 902. The memory may be integrated in the control circuitry.

The apparatus may comprise one or more interface circuitries 908. The interface(s) may connect the apparatus to other network elements of the communication system. If the apparatus is a base station (or gNB), the interface(s) may provide a wired or wireless connection to the communication system. The interfaces maybe transceivers configured to communicate with user terminals and interfaces to communicate with core network and other base stations. If the apparatus is user terminal, the interfaces may be transceiver configured to communicate with base stations (such as gNB) and access points of various wireless standards. The interface(s) may be operationally connected to the control circuitry 902.

The software 906 may comprise a computer program comprising program code means adapted to cause the control circuitry 902 of the apparatus to perform the embodiments described above and in the claims.

In an embodiment, the apparatus comprises at least one processor or control circuitry 902 and at least one memory 904 including a computer program code 906, wherein the at least one memory and the computer program code are configured, with the at least one processor, to cause the apparatus to carry out the functionalities of the apparatus 900 according to any one of the embodiments of described above and in the claims. In an embodiment, the hardware described in connection with FIG. 3 is utilised as well.

According to an aspect, when the at least one processor or control circuitry 902 executes the computer program code, the computer program code causes the apparatus to carry out the functionalities according to any one of the embodiments described above and in the claims.

According to an aspect, when the at least one processor or control circuitry 902 executes the computer program code, the computer program code causes the apparatus to carry out the functionalities according to any one of the embodiments described above and in the claims utilising the hardware described in connection with FIG. 3.

According to another embodiment, the apparatus comprises the at least one processor or control circuitry 902 and at least one memory 904 including a computer program code 906, wherein the at least one processor or control circuitry 902 and the computer program code 906 perform the at least some of the functionalities of the apparatus 900 according to any one of the embodiments described above and in the claims. Accordingly, the at least one processor or control circuitry 902, the memory, and the computer program code form processing means for carrying out some embodiments of the present invention in the apparatus 900.

An embodiment provides a method, comprising obtaining by a data memory multiple-input-multiple-output symbols received over a transmission channel, the symbols comprising a plurality of layers, each layer comprising a constellation point of multiple candidate constellation points, utilising a plurality of Arithmetic and Logic Units, ALUs, comprising at least one real and imaginary part, the ALUs of the apparatus comprising real and imaginary part having different precisions by having different number of bits, controlling by a controller the data memory and a plurality of ALUs, connecting the controller, the data memory, and the plurality of ALUs with each other with a data bus of a given width, searching by the controller utilising ALUs for each layer the constellation point among the candidate constellation points by minimising a given cost function, wherein the search on each layer is performed utilising a given precision, each layer having a precision smaller or equal than the precision of a previous layer.

In an embodiment, the apparatus comprises means for obtaining multiple-input-multiple-output symbols received over a transmission channel, the symbols comprising a plurality of layers, each layer comprising a constellation point of multiple candidate constellation points, means for selecting for each layer a precision, each layer having a precision smaller or equal than the precision of a previous layer and means for searching for each layer, utilising the selected precision, the constellation point among the candidate constellation points by minimising a given cost function, utilising a plurality of Arithmetic and Logic Units, ALUs, comprising at least one real and imaginary part, the ALUs of the apparatus comprising real and imaginary part having different precisions by having different number of bits, the data memory and the plurality of ALUs being connected with each other by a data bus of a given width.

In an embodiment, the processes or methods described in above figures may also be carried out in the form of one or more computer processes defined by one or more computer program. A separate computer program may be provided in one or more apparatuses that execute functions of the processes described in connection with the figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits, ASICs. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising
   a data memory configured to obtain multiple-input-multiple-output symbols received over a transmission channel, the multiple-input-multiple-output symbols comprising a plurality of layers, each layer comprising a constellation point of multiple candidate constellation points;
   a plurality of Arithmetic and Logic Units, ALUs, comprising at least one real and imaginary part, the ALUs of the apparatus comprising real and imaginary part having different precisions by having different number of bits,
   a controller configured to control the data memory and a plurality of ALUs,
   a data bus of a given width connecting the controller, the data memory, and the plurality of ALUs with each other,
   the controller being configured to search utilising ALUs for each layer of the constellation point among the multiple candidate constellation points by minimising a given cost function, wherein a search on each layer is performed utilising a given precision, each layer having a precision smaller or equal than a precision of a previous layer.

2. The apparatus of claim 1, the controller being configured to
   divide layers in groups, each group comprising a number of successive layers;
   applying a same given precision to layers belonging to a same group.

3. The apparatus of claim 1, wherein the controller is configured to
   obtain information on required precision for different layers under different parameters of the transmission channel;
   select the precision settings for different layers based on determined parameters;
   store received symbol of the transmission channel in data memory;
   select precision for current layer;

select the ALUs of a required precision for calculation of real and imaginary parts of the current layer;
obtain output value by computing cost functions in real and imaginary parts of the selected ALUs,
if the current layer is a last layer, write output value to data memory,
otherwise convert precision of an output value for next layer, write the output value for next layer to data memory and start to calculate next layer.

4. The apparatus of claim 3, the controller being configured to
receive parameters of the transmission channel and
select the precision on each layer or group based on the determined parameters of the transmission channel.

5. The apparatus of claim 3, the controller being configured to
determine the precision on each layer or group before search is performed and store the determined precision in memory.

6. The apparatus of claim 3, the controller being configured to
determine the precision on each layer or group at run-time when search is performed.

7. The apparatus according to claim 1, wherein a sum of the bits of the at least one real and imaginary parts of an ALU is a same as a given width of the data bus.

8. The apparatus of claim 6, wherein, at least for some ALUs, the different number of the bits of the at least one real part and at least one imaginary part of an ALU is unequal, a sum being equal to a given width of the data bus.

9. The apparatus according to claim 1, wherein the apparatus is a sphere detector.

10. The apparatus of claim 1, wherein the apparatus in included in a base station of a communication system.

11. The apparatus according to claim 10 wherein the controller of the apparatus is configured to obtain information on required precision for the different layers under different parameters of the transmission channel;
select the precision settings for different layers based on determined parameters;
store received symbol of the transmission channel in data memory;
select precision for current layer;
select the ALUs of the required precision for calculation of real and imaginary parts of the current layer;
obtain output value by computing cost functions in real and imaginary parts of the selected ALUs,
if the current layer is a last layer, write output value to data memory,
otherwise convert precision of the output value for a next layer, write the output value to data memory and start to calculate the next layer.

12. The apparatus of claim 1, wherein the apparatus in included in an end-user handheld device of a communication system.

13. The apparatus according to claim 12 wherein the controller of the apparatus is configured to
obtain information on required precision for different layers under different parameters of the transmission channel;
select precision settings for different layers based on determined parameters;
store received symbol of the transmission channel in data memory;
select precision for current layer;
select the ALUs of the required precision for calculation of real and imaginary parts of the current layer;
obtain output value by computing cost functions in real and imaginary parts of the selected ALUs,
if the current layer is a last layer, write output value to data memory,
otherwise convert precision of the output value for a next layer, write the output value to data memory and start to calculate the next layer.

14. The apparatus of claim 12, wherein the end-user handheld device is one of the following: a mobile station, a mobile phone, a smartphone, a personal digital assistant, a device using a wireless modem, a laptop and/or a touch screen computer, a tablet, a game console, a notebook, or a multimedia device.

15. A method, comprising:
obtaining multiple-input-multiple-output symbols received over a transmission channel, the multiple-input-multiple-output symbols comprising a plurality of layers, each layer comprising a constellation point of multiple candidate constellation points;
selecting for each layer a precision, each layer having a precision smaller or equal than a precision of a previous layer;
searching for each layer, utilising the selected precision, of the constellation point among the multiple candidate constellation points by minimising a given cost function, utilising a plurality of Arithmetic and Logic Units, ALUs, comprising at least one real and imaginary part, the ALUs comprising real and imaginary part having different precisions by having different number of bits, the data memory and the plurality of ALUs being connected with each other by a data bus of a given width.

16. The method of claim 15, further comprising: dividing layers in groups, each group comprising a number of successive layers; applying a same precision to layers belonging to a same group.

17. The method of claim 15 further comprising obtaining information on required precision for different layers under different parameters of the transmission channel
selecting the precision settings for different layers based on determined parameters;
storing received symbol of the transmission channel;
selecting precision for current layer;
selecting the ALUs of a required precision for calculation of real and imaginary parts of the current layer;
obtaining output value by computing cost functions in real and imaginary parts of the selected ALUs,
whereby if the current layer is a last layer, writing output value to data memory,
otherwise convert precision of an output value for next layer, writing the output value for next layer to a data memory and starting to calculating a next layer.

18. A non-transitory computer medium comprising instructions for causing an apparatus of a communication system to perform at least the following:
obtaining multiple-input-multiple-output symbols received over a transmission channel, the multiple-input-multiple-output symbols comprising a plurality of layers, each layer comprising a constellation point of multiple candidate constellation points;
selecting for each layer a precision, each layer having a precision smaller or equal than a precision of a previous layer;
searching for each layer, utilising the selected precision, of the constellation point among the multiple candidate constellation points by minimising a given cost function, utilising a plurality of Arithmetic and Logic Units, ALUs, comprising at least one real and imaginary part, the ALUs of the apparatus comprising real and imaginary part having different precisions by having different number of bits, the data memory and the plurality of ALUs being connected with each other by a data bus of a given width.

* * * * *